United States Patent
Coffey et al.

(10) Patent No.: US 10,569,356 B1
(45) Date of Patent: Feb. 25, 2020

(54) DEBURRING TOOL FOR FRICTION STIR WELDING, AND RELATED METHODS

(71) Applicant: Seagate Technology LLC, Cupertino, CA (US)

(72) Inventors: Jerome Thomas Coffey, Boulder, CO (US); Samuel Edward Severson, Longmont, CO (US); Jeffrey L. Bruce, Longmont, CO (US); Patrick J. Hains, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/956,302

(22) Filed: Apr. 18, 2018

(51) Int. Cl.
| | |
|---|---|
| *B23K 20/00* | (2006.01) |
| *B23K 20/26* | (2006.01) |
| *B23K 20/12* | (2006.01) |
| *B23K 26/361* | (2014.01) |

(52) U.S. Cl.
CPC .......... *B23K 20/26* (2013.01); *B23K 20/1255* (2013.01); *B23K 26/361* (2015.10)

(58) Field of Classification Search
CPC .. B23K 20/1255; B23K 20/125; B23K 37/08; B23K 20/12
See application file for complete search history.

(56) References Cited

U.S. PATENT DOCUMENTS

| | | | |
|---|---|---|---|
| 5,488,885 A | 2/1996 | Byers et al. | |
| 2008/0217377 A1* | 9/2008 | Stol | B23K 20/1255 228/2.3 |
| 2015/0097020 A1* | 4/2015 | Rosal | B23K 20/1215 228/2.1 |
| 2015/0332733 A1 | 11/2015 | Lapp et al. | |
| 2017/0151625 A1* | 6/2017 | Utsumi | B23K 20/12 |

FOREIGN PATENT DOCUMENTS

| | | |
|---|---|---|
| CN | 102974850 A | 3/2013 |
| CN | 104070183 A | 10/2014 |

* cited by examiner

*Primary Examiner* — Erin B Saad
(74) *Attorney, Agent, or Firm* — Kagan Binder, PLLC (57) ABSTRACT

Described are deburring tools useful for deburring a friction stir weld, methods of forming a friction stir weld combined with a deburring step, and assemblies such as electronic device enclosures that include a deburred friction stir weld.

19 Claims, 9 Drawing Sheets

DEBURRING TOOL FOR FRICTION STIR WELDING, AND RELATED METHODS

FIELD

The invention relates to deburring tools useful for deburring a friction stir weld, methods of forming a friction stir weld combined with a deburring step, and assemblies such as (but not limited to) electronic device enclosures that include a deburred friction stir weld.

BACKGROUND

Friction stir welding is a method useful for joining together two separate metal pieces by way of a strong, permanent metallic bond (i.e., weld). The method involves rotating a friction stir weld tool at high speed and contacting the tool, with pressure, at a joint formed between edges of the metal pieces. Mechanical stirring and frictional heat introduced into the material at the joint by the rotating tool form the weld. A lengthwise joint is produced by moving the rotating tool along the joint.

Friction stir welding can be useful in manufacturing a metal product that includes two adjacent metal pieces that form a joint that requires a weld. As a single non-limiting example, friction stir welding may be useful for manufacturing enclosures for electronic devices such as data storage devices (e.g., hard disk drives or HDDs). To increase reliability of certain types of electronic devices, their components may be placed within a metal enclosure that can be closed or sealed to prevent undesired moisture, gases, or particulates from contacting these components. The enclosure may preferably be hermetically sealed to create a compositionally stable interior atmosphere and to prevent gases from entering or exiting the interior. Enclosures of some hermetically-sealed electronic devices (e.g., hard disk drives) are filled with a non-air atmosphere, for example a low density atmosphere (e.g., helium), as a way to improve device performance. There are various benefits to operating a hard disk drive in a low density atmosphere. A low density atmosphere (relative to air, e.g., a helium atmosphere) in a hard disk drive can reduce the amount of drag force that affects a spinning disk or a stack of closely-spaced spinning disks. The reduced amount of drag can significantly reduce the amount of power required to cause the stack of disks to spin. Also, a low density atmosphere can reduce the amount of un-wanted, non-rotational movement or "flutter" that can occur in a spinning disk and a suspension assembly during use. Reducing un-wanted motion of a disk or suspension assembly can allow adjacent disks of a disk stack to be placed more closely together, which increases areal density (a measure of the quantity of information bits that can be stored on a given area of disk surface) by enabling a narrower data track pitch. Efficient thermal conduction of helium can also allow for a reduced operating temperature of a device, and a lower density gas (relative to air) can produce less acoustic noise. The reliability of a hard disk drive that contains helium in a hermetically sealed enclosure can also be increased due to a reduced level of humidity at the drive interior, due to elimination of other gases and contaminants such as corrosive gases, and due to a reduced sensitivity of the atmosphere to altitude and external pressure variations.

On a commercial scale, for friction stir welding to be a method of choice for welding two metal pieces together, such as for a hard disk drive enclosure, the friction stir welding process must be efficient, cost-effective, reliable, and must produce a high quality weld that is strong, highly impermeable to gases, and aesthetically suitable, meaning that the weld finish is smooth and preferably substantially burr free.

SUMMARY

During friction stir welding, burrs may form on a surface of the weld. "Burrs" (which include other deformities sometimes referred to as "sharps") are deformities that can be formed during a welding process by molten metal that forms not into the desired weld material but into small pieces of solid metal attached to the surface, typically at an edge of a weld, extending from the weld surface as protrusions that may often be sharp or jagged. These deformities, particularly if they are sharp, create the risk of damaging equipment or other in-process parts, and of causing injury to those who manually handle the welded piece. Burrs can also be aesthetically undesirable, and can become loose and contaminate a workspace or workspace atmosphere. Thus, after a step of friction stir welding, burrs must be removed from the surface of the friction stir weld.

A step of removing burrs from a friction stir weld used as a hermetic seal of a hard disk drive enclosure should be efficient to perform on a commercial scale, and should remove substantially all burrs (e.g., at least 98 or 99 percent of burrs) from a friction stir weld surface. A preferred method should avoid creating dust particles or other airborne debris in a clean area (e.g., cleanroom) of a manufacturing plant. Preferred deburring methods should also avoid or minimize removing useful material from a friction stir weld, i.e., should not remove material of the friction stir weld in a manner that could reduce the size (thickness) of the weld and the strength of the welded seam in preventing gas (e.g., helium) from leaking from the interior of enclosure.

Deburring is a common practice in the machined parts arts, and there are many approaches. Examples of past techniques for removing burrs from a machined or welded metal part have involved a brush or other abrasive tool (wire brushes, plastic brushes, deburring tools, etc.) that is passed multiple times over a surface of the part that contains burrs, to mechanically remove the burrs. As a drawback of such techniques, the brush or tool is commonly moved rapidly over the surface, with multiple passes, to effectively remove the burrs, which may be commercially sub-optimal from an efficiency perspective and which may result in uncontrolled debris (e.g., dust) and contamination of a work area by loose burr particles. Also, wire and plastic brushes wear out quickly, and deburring tools are rigid, can leave an uneven finish, and can be difficult to use in a manner that produces a deburred surface that meets stringent part dimension tolerances.

Applicant's research in methods and equipment for friction stir welding has led Applicant to identify methods and devices that can be used to successfully weld, by friction stir welding methods, a metal base and a metal cover of an electronics enclosure such as an enclosure of a hard disk drive. Applicant's research, for example, has led to designs of useful and advantageous friction stir weld tools, useful and advantageous welding conditions and operating parameters, and useful and advantageous cover and base configurations.

In example friction stir welding methods of the present description, two opposed metal pieces that form an enclosure that includes a shoulder joint where the two metal pieces meet, can be welded at the joint by a friction stir weld method. The two metal pieces include one piece that is a cover and one piece that is a base. The base has a vertically-extending sidewall that includes a shoulder at an outer surface of the sidewall between a top and a bottom of the sidewall. The cover includes a top planar portion and a vertically-extending lip that extends downward from the perimeter of the cover. When the cover is placed over the base, the lip extends along the outer surface of the sidewall of the base and a lip end portion contacts the shoulder of the sidewall to form a joint.

The friction stir welding step uses a friction stir weld tool that is rotated at high speed, pressed against the joint, and moved along the joint to form the friction stir weld. The rotating tool in contact with the base and cover materials at the joint generates heat through the axially-applied load. The amount of heat is not enough to melt the materials of the cover and base, but is enough to soften the materials so that the structure of the tool, by rotational movement, can mix the materials from the cover and the base together and form a welded joint.

Very commonly, a process of forming a friction stir weld produces burrs at edges of the weld that is formed. As presented herein, these burrs may be efficiently and effectively removed by passing a relatively simple metal deburring tool, having a metal edge, over the weld to mechanically remove the burrs. The deburring tool can include only a single metal edge (i.e., a single cutting edge) that contacts a weld surface having burrs, to remove the burrs. A method of using the deburring tool can be effective by use of a single pass of the tool over the weld, in one direction, i.e., does not require repeated, circular, or reciprocating motion. The deburring step can be performed shortly after the step of forming the friction stir weld.

In one aspect the invention relates to a method of removing burrs from a friction stir weld using a burr removal tool. The friction stir weld has a width, a length, and burrs located at a surface of the weld. The burr removal tool has a metal edge extending along a width. The method includes: orienting the width of the metal edge in substantial alignment with the width of the friction stir weld; contacting the metal edge with the surface of the friction stir weld; and moving the metal edge along the friction stir weld to cause the metal edge or an adjacent surface to contact the burrs to remove the burrs from the surface.

In another aspect the invention relates to a method of producing a friction stir weld that includes burrs at a surface of the weld, and removing the burrs from the surface. The method comprising, using a rotating friction stir weld tool to produce a friction stir weld on a workpiece that includes a first metal piece and a second metal piece, by: placing the tool in contact with the workpiece; and rotating the tool about the axis while the tool contacts the workpiece to form a friction stir weld between the first metal piece and the second metal piece, wherein the friction stir weld has a width, a length, and burrs located at a surface of the weld. The method also includes removing the burrs from the surface using a burr removal tool, the burr removal tool having a metal edge extending along a width, burr removal comprising: orienting the width of the metal edge in substantial alignment with the width of the friction stir weld; contacting the metal edge with the surface of the friction stir weld; and moving the metal edge along the friction stir weld to cause the metal edge or an adjacent surface to contact the burrs and remove the burrs from the surface.

BRIEF DESCRIPTION OF THE FIGURES

All figures are schematic and are not to scale.

DETAILED DESCRIPTION

Friction stir welding is a technique that is known to be useful in various applications for welding metals. See for example U.S. Pat. Nos. 8,016,179 and 9,536,572, the entireties of these documents being incorporated herein by reference. Friction stir welding techniques, however, are known to incidentally produce imperfections or deformities (collectively referred to herein as "burrs"), which can include very sharp edges, at a friction stir weld surface. Burrs are not only sharp but are aesthetically undesirable. Burrs can result in damage to equipment in a processing area, contamination of the processing area, or both, if not carefully removed and isolated. For processing many commercial products, including electronic devices, burrs that are created on workpieces during processing must be removed from a workpiece and isolated. Preferred methods for removing burrs should be commercially efficient, highly effective, should not substantially compromise the structure of the underlying workpiece (e.g., a friction stir weld of a two-piece metal enclosure), and should be performed without allowing the burrs to contaminate a process area or a processing environment.

Described as follows are deburring methods, deburring tools, and uses of these methods and tools in forming a deburred friction stir weld. The methods and tools can be useful in deburring a friction stir weld that is part of any type of workpiece that desirably includes a precise, aesthetically pleasing finish, and that may in particular include the friction stir weld as a hermetic seal. Specific examples of workpieces with which the present methods and tools may be used include electronic devices such as hard disk drives and other devices that may include a friction stir weld that functions to hermetically seal an interior of a device enclosure.

The described methods can provide commercially efficient and effective removal of burrs from a surface of a friction stir weld without the use of a brush, file, or other type of multi-pass, multi-cutting-surface abrasive tool that is used by repeatedly contacting a workpiece (e.g., weld) surface with a cutting edge. Previous brush, file, or other types of abrasive burr removal tools include multiple cutting edges (for removing burrs) or are used by contacting a workpiece surface multiple times with a cutting edge in a reciprocating, rotational, or multi-pass fashion, meaning that a cutting edge contacts a burr-containing workpiece surface multiple times to effectively remove all burrs from the surface. Such brushes, files, and other comparable burr removal tools used according to such previous techniques tend to produce dust or airborne particulates, may damage or degrade the workpiece being deburred (e.g., weld), and can be rapidly worn down over a relatively short useful product lifetime.

The presently-described methods can be highly precise, allowing for removal of a high percentage (e.g., 98 or 99 percent) of burrs from a friction stir weld surface by a single, unidirectional pass of a single contacting surface (e.g., metal edge) of a deburring tool over a friction stir weld surface. Preferred methods can be effective to remove burrs from the friction stir weld surface without repeated contact of the contacting surface of the tool with the weld, and without removing a more than insubstantial amount of weld material from the friction stir weld. The high-precision nature of the burr removal step avoids removing material of the weld, to thereby maintain the integrity and initial size (thickness) of the friction stir weld and not substantially reduce or otherwise compromise the ability of the weld to act as a hermetic seal, e.g., that retains a desired gas atmosphere (e.g., helium) at an interior of an electronic device enclosure.

A method as described, for deburring a friction stir weld, is performed on a friction stir weld that includes burrs at a surface of the weld. The method involves using a burr removal tool that includes a contacting surface referred to herein as a "metal edge," to mechanically remove burrs from a surface of the friction stir weld. The friction stir weld includes a width extending between two side edges, a length extending in a direction of the edges, and burrs located at a surface of the weld, generally along the two edges. Due to methods that are used to form the friction stir weld (e.g., due to a slight tilt of the friction stir weld tool tip during weld formation), the friction stir weld surface extending between the two opposed edges may be slightly concave.

Figure 1:
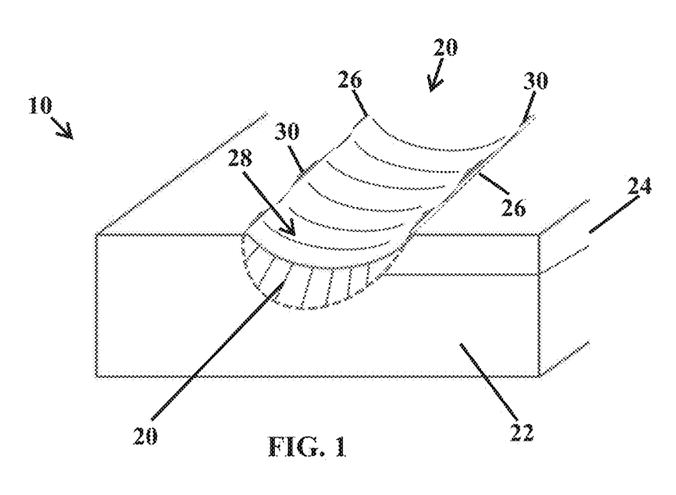
FIG. 1 is a perspective view of a friction stir weld of the present description that includes burrs at the weld surface.

FIG. 1 illustrates an example of a friction stir weld prepared on a workpiece. Friction stir weld 20 may be formed by any friction stir welding technique (for example, but not necessarily, as described herein) that causes burrs to be formed in association with the friction stir weld, typically at edges of the weld. Workpiece 10 may be any workpiece that includes two separate pieces joined by friction stir weld 20, for example a base (22) and a cover (24) made of aluminum or another metal and that can function as a hermetically-sealed enclosure of an electronic device. Friction stir weld surface 28 extends in a width direction between two opposed side edges 26, is slightly concave, and extends in a longitudinal (i.e., length) direction perpendicular to the width direction. Burrs 30 are shown as irregular or jagged structures located along the lengths of the two opposed edges 26.

A burr removal tool as described can include a tool body in the form of a basic metal (e.g., carbide) piece that includes at an end (or bottom) a contacting surface that extends in a width direction of the burr removal tool. The contacting surface, referred to as a "metal edge," is a surface of the deburring tool that contacts the workpiece during a burr removal step. The contacting surface can be, for example, a sharp metal edge (alternately referred to as a "cutting edge"), or may alternately be an unsharpened (even rounded) edge surface that may be contacted with a surface of a friction stir weld and advanced along the weld so that either the metal edge itself or a surface that is adjacent to the metal edge, on a "front" side of the metal edge as the tool moves along the weld, will contact burrs associated with the weld to dislodge the burrs from the weld.

The tool can be used to mechanically remove burrs from a friction stir weld surface by contacting the metal edge or an adjacent surface with the burrs to physically dislodge the burrs from the surface. The tool can be moved over a friction stir weld that contains burrs, with the metal edge contacting the weld, and the metal edge or an adjacent surface contacting the associated burrs, so that the metal edge or adjacent surface contacts and removes the burrs as the metal edge advances unidirectionally along a length of the weld.

The tool is made of a rigid piece of metal that includes the metal edge at an end (e.g., at a "bottom"). The tool may be made from a useful hard metal material such as carbide, steel, or a hardened metal (e.g., hardened steel), and can be mounted to a carriage through a flexible, resilient connector that includes a spring, e.g., an air cylinder. The connector provides compliant (slightly moveable) contact, with downforce, of the tool against a workpiece, allowing for an amount of movement between the tool and the workpiece.

Example burr removal tools useful in a method as described can include a front face, a back face, a width, a thickness extending between the front face and the back face, and one or more bottom faces located between the front face and the back face along the thickness and also along the width. An edge (a "bottom" edge) of the front face meets an edge (a "front" edge) of the bottom face along the width of the tool to produce and define a width-extending front-bottom edge of the tool. The front face extends in the width direction and in a second direction, which may be referred to as a "height" direction, and may preferably be flat. An edge (a "bottom" edge) of the back face meets an edge (a "back" edge) of the bottom face along the width of the tool to produce and define a width-extending back-bottom edge of the tool. The back face extends in the width direction and in a "height" direction, and may also be preferably flat.

A bottom face may preferably be flat, and may extend between the front face and the back face in a width direction and also in a direction that may be referred to as a "thickness" of the tool. Relative to the orientation of the front face, the bottom face may be angled at the intersection between the front face and the bottom face, i.e., at the metal edge. In certain example tools, an angle made at the intersection of the front face and a bottom face (i.e., at the front-bottom face), along the width of the tool, may be a perpendicular, obtuse, or an acute angle, e.g., an angle in a range from 60 to 120 degrees, e.g., from 70 or 80 to 90 degrees relative to the surface.

In certain embodiments, the bottom face may be segmented into two faces that extend along the width direction and in the thickness direction, e.g., a front-bottom face and a back-bottom face. The front-bottom face may be flat and extends from the front-bottom edge in a width and a thickness direction to a width-extending middle-bottom metal edge located between (and parallel to) the front-bottom edge and the back-bottom edge, the middle-bottom edge being formed at a location at which the front-bottom face meets the back-bottom face. The back-bottom face is located between the back-bottom edge and the middle-bottom edge, also along a width of the tool and in a thickness direction. In this configuration, the front-bottom face and the back-bottom face extend in a width direction and between the front face and the back face, and the front bottom face and the rear bottom face meet to form a metal edge (the middle-bottom edge), which extends in the width direction of the tool.

Figure 4:
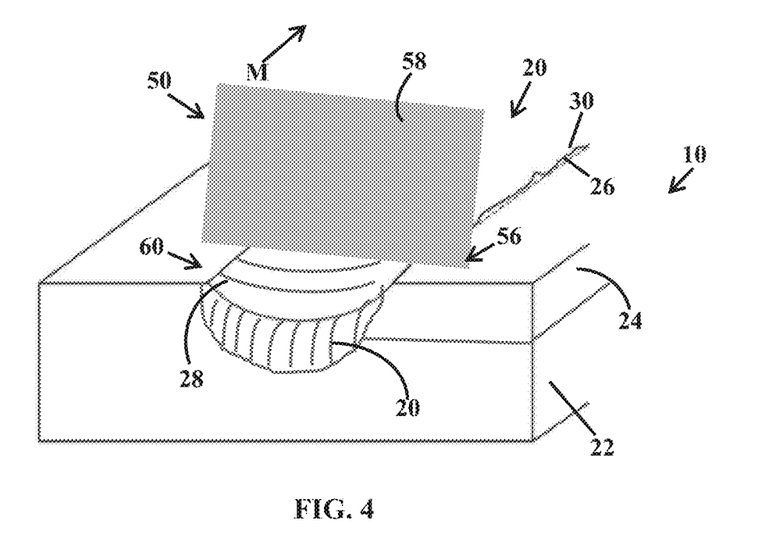
FIG. 4 is a front perspective view of the burr removal step of FIG. 2.
Figure 5:
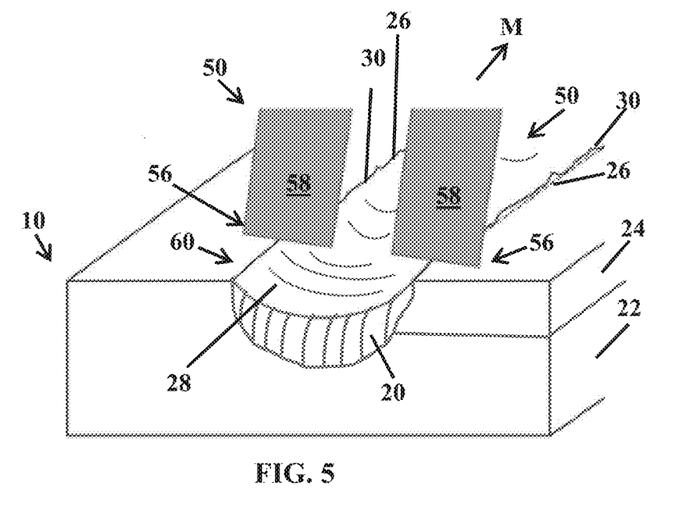
FIG. 5 is a front perspective view of an alternate embodiment of a burr removal step of the present description.

In various embodiments a tool and its associated faces and metal edges may be continuous along the width (see, e.g., FIG. 4), or may alternately include two separated, parallel segments, each of which includes a front face, a bottom face, a back face, and associated edges, as two segments divided by a space at a middle portion of the width (see FIG. 5). The metal edge or metal edge segments may preferably be straight along the width.

The tool, e.g., the metal edge and adjacent portions that are operative for burr removal, may be made from a useful hard (e.g., hardened) metal material such as steel, hardened steel, a carbide, or a similar hard or hardened metal. Examples include carbide materials such as tungsten carbide and titanium carbide.

The tool can include a basic structure that includes a shaft or other tool body that includes and supports metal edges at a bottom or an end of the tool body. The tool (e.g., shaft or body) can be mounted directly or indirectly (through a connector) to a carriage that holds and moves the tool during use relative to a workpiece, with a metal edge contacting the workpiece and with a force applied to the tool to hold the tool (at the metal edge) against the workpiece (at a surface of a friction stir weld).

According to example methods of using a deburring tool to remove burrs from a friction stir weld formed on an electronic device enclosure, e.g., a hard disk drive enclosure, the enclosure may have a perimeter around which the friction stir weld is formed. The tool can be moved relative to the workpiece, which may preferably be stationary, to cause a desired rate of movement of the tool, and a desired force can be applied to the tool to hold the tool against the workpiece for the burr removal step. The angle of the tool (e.g., the angle of the tool body, front-to-back) relative to the weld surface can also be adjusted. The combination of the angle of the tool, magnitude of the downward force of the tool against the weld, and the translational speed of the tool along the length of the weld, are all features of the deburring method that may be adjusted to provide a desired performance of the tool in a deburring step.

During a deburring step the deburring tool may be moved along a surface of a friction stir weld, unidirectionally in a lengthwise direction, at any useful speed, preferably a speed that will efficiently remove all or substantially all of the burrs that are present at the friction stir weld surface. Examples of useful speeds of a deburring tool along a friction stir weld during a deburring step can be in a range from about 1.6 to 200 millimeters per second.

Also during a deburring step the deburring tool may be held using any desired amount of force to hold the tool against the workpiece while being moved along the surface of a friction stir weld. The amount of force can be any that is effective, at a useful speed of the tool along the length of the workpiece, to efficiently remove all or substantially all of the burrs that are present at the friction stir weld surface. Examples of useful forces used to hold a deburring tool against a workpiece can be in a range from about 3 to 10 pounds.

The deburring tool can preferably be held and supported during use by a carriage that moves the deburring tool along a length of a weld, e.g., around an entire perimeter of an enclosure, while the metal edge contacts a friction stir weld to remove burrs from the friction stir weld. Desirably, the carriage is capable of causing the metal edge of the tool to be moved along the entire length of the weld (e.g., an entire perimeter of an enclosure) one single time (including with good contact at any corners of a cornered enclosure), while removing substantially all of the burrs from the weld, such as by removing at least 98 or 99 percent of burrs associated with the weld, by passing the tool over the weld only once in a single direction (i.e., unidirectionally).

The tool may be attached to the carriage through a flexible, resilient connector such as a spring or an air cylinder that maintains contact between the metal edge of the tool and the workpiece while allowing for a small amount of movement between the metal edge and the workpiece surface. The flexible connector can allow the tool and the metal edge to move slightly during use, for example because of mechanical or frictional forces that may be placed on the metal edge and tool during contact with burrs during burr removal, because of slight variations in part size of a workpiece or workpiece components, due to slight variations in the shape and surface features of a friction stir weld, or due to slight movements between the carriage and the workpiece that occur while the carriage moves the tool relative to the workpiece.

According to preferred deburring methods a deburring step can be performed shortly following formation of the burrs, i.e., shortly following a step of forming a friction stir weld that produces the burrs. In example embodiments the deburring step may be performed within 5, 3, 2, 1, or less than 1 or 0.5 second following the step of forming the friction stir weld.

Optionally, based on these or other example methods, the deburring tool may be moved in conjunction with a tool that forms the friction stir weld. For example, a deburring tool may be moved in coordination with a rotating friction stir weld tool that forms a friction stir weld shortly before the deburring step. The deburring tool may be placed a short distance behind the friction stir weld tool, while both tools are advanced along a workpiece, so that the friction stir weld is formed and the deburring tool contacts the surface of the friction stir weld promptly after the friction stir weld and associated burrs have been formed. By such a method, the deburring tool may be held and maintained at a fixed distance behind a friction stir weld tool while the friction stir weld tool is used to form a friction stir weld, e.g., maintained at a fixed distance behind the friction stir weld tool that is in a range from 0.1 to 1 or 2 centimeters from the friction stir weld tool. One manner by which the deburring tool may be maintained at a fixed distance from a friction stir weld tool during use, while both are advanced along a length of a workpiece and maintained in contact with the workpiece, is to attach both of the rotating friction stir weld tool and the deburring tool to a single carriage. The carriage can support both the friction stir weld tool and the deburring tool while maintaining fixed distance between them, and can move the two tools together along a length of a workpiece so that the friction stir weld tool forms a friction stir weld and the deburring tool quickly thereafter performs a deburring step on the friction stir weld.

Alternatively, or consistent with these example methods, the temperature of a friction stir weld and associated burrs can be above ambient temperature during the deburring step. During formation of the friction stir weld the material of the weld and associated burrs will reach a temperature that allows flow of the weld material without melting the material. Shortly after formation of the friction stir weld, e.g., within 10 seconds following formation of the weld, the temperature of the material of the friction stir weld and the burrs will remain well above ambient temperature, e.g., will be at a temperature of at least 100 degrees Celsius (C), e.g., in a range from 100 to 350 degrees C., at which temperature a burr removal step can be performed.

Figure 2A:
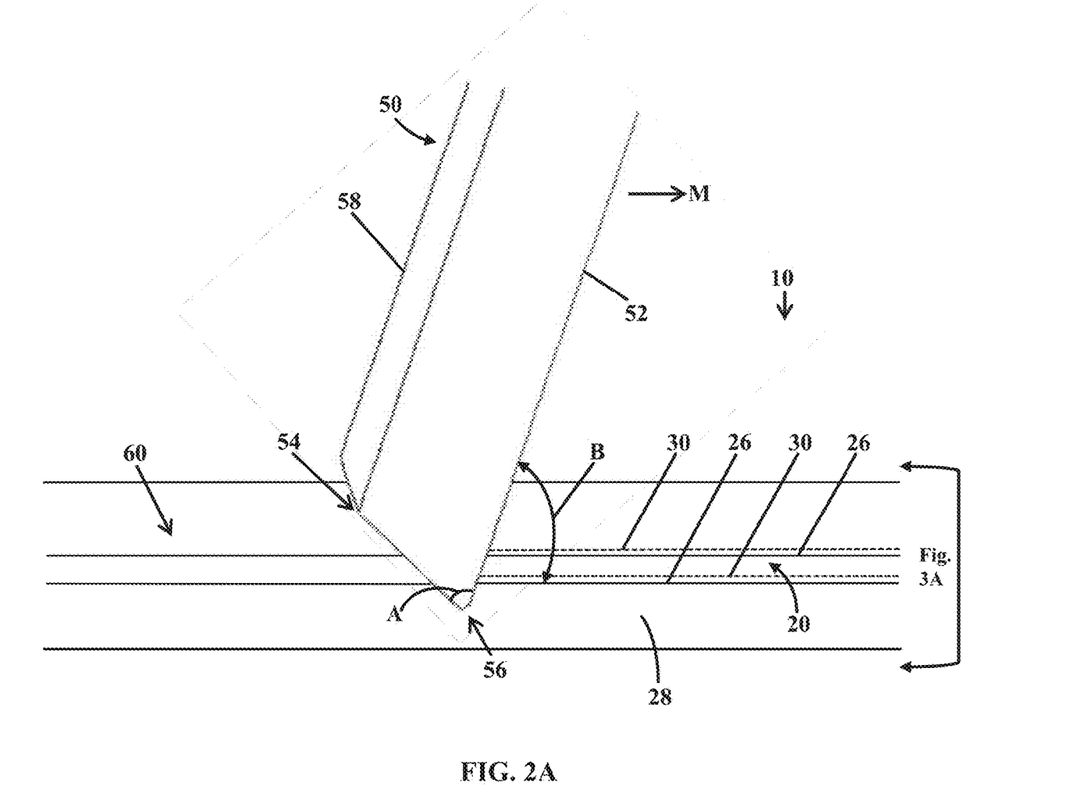
FIG. 2A is a side view of a friction stir weld of the present description that includes burrs at the weld surface, and an example deburring tool.

Referring to FIG. 2A, example deburring tool 50 includes front face 52, bottom face 54, and back face 58. Bottom face 54 extends in a thickness direction and in a width direction of the tool. Front face 52 extends in the width direction and in a height direction. A front edge of bottom face 54 meets at a bottom edge of front face 52 to form metal edge 56, extending along the width of tool 50. Angle A, defined by the intersection of front face 52 and bottom face 54, is illustrated as an acute angle in a range from 60 to 90, e.g., from 60 to 75 degrees. The thickness of tool 50 in combination with angle A and the composition of tool 50 together combine to form metal edge 56 that is sufficiently rigid and durable to allow metal edge 56 to be repeatedly contacted with burrs on surfaces of friction stir welds without the metal edge becoming unduly cracked, chipped, or worn down over a commercially acceptable useful lifetime of the tool.

In use to remove burrs from a friction stir weld, the width of the metal edge of the burr removal tool is oriented in a direction that is substantially aligned with the width of the friction stir weld. For example, the direction of the width of the metal edge may be parallel to the width of the friction stir weld or within 5, 2, or 1 degree from parallel. A metal edge of the tool contacts the surface of the friction stir weld and is held against the surface under pressure and moved along the friction stir weld in a lengthwise direction of the weld while contacting the surface under the pressure. Moving the metal edge along the length of the friction stir weld with maintained contact and pressure causes the metal edge or an adjacent surface to contact the burrs, which causes the metal edge or the adjacent surface to dislodge the burrs from the surface of the friction stir weld. According to preferred methods, substantially all of the burrs can be removed from the weld by passing the tool along the length of the weld only once in a single direction (i.e., unidirectionally).

Referring to example tool 50 and a related method as illustrated at FIG. 2A, workpiece 10 includes friction stir weld 20 having edges 26, surface 28, and burrs 30. During use to remove burrs 30 from surface 28, metal edge 56 of burr removal tool 50 is contacted with surface 28 (e.g., at or about edges 26 thereof) with the width of metal edge 56 oriented in a direction that is substantially aligned with the width of friction stir weld 20. While metal edge 56 is held in contact with surface 28, with a desired amount of force applied to tool 50 to hold tool 50 against surface 28, the force is transferred into a pressure applied by metal edge 56 to surface 28. While maintaining the contact and pressure, metal edge 56 is moved along a length of friction stir weld 20, e.g., in direction M as represented by the arrow of FIG. 2A. Movement of metal edge 56 along friction stir weld 20 causes metal edge 56 or an adjacent (front) surface to contact burrs 30, which causes burrs 30 to be dislodged and removed from friction stir weld 20. Preferably, only a single pass of tool 50 over surface 28 is sufficient to produce a burr-free friction stir weld surface 60 on the trailing side of tool 50.

Still referring to FIG. 2A, while example tool 50 is advanced in direction M along a length of friction stir weld 20, tool 50 may be oriented vertically or substantially vertically relative to the workpiece and surface 28, to produce an angle (B) between front face 52 (at a bottom portion, adjacent to metal edge 56) and planar surface 28 of friction stir weld 20. As shown generally at FIG. 2A, angle B may be vertical (90 degrees) or slightly less than vertical, i.e., slightly acute. For example angle B may be in a range from 60 or 65 to 90 degrees, e.g., from 75 to 85 degrees.

Figure 3A:
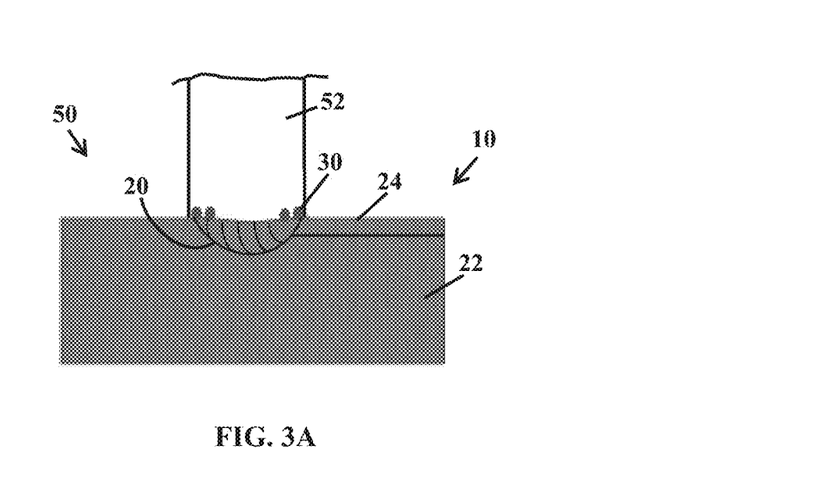
FIGS. 3A and 3B are is a front view of the burr removal step of FIG. 2 and an end view of the step after a burr removal step.
Figure 3B:
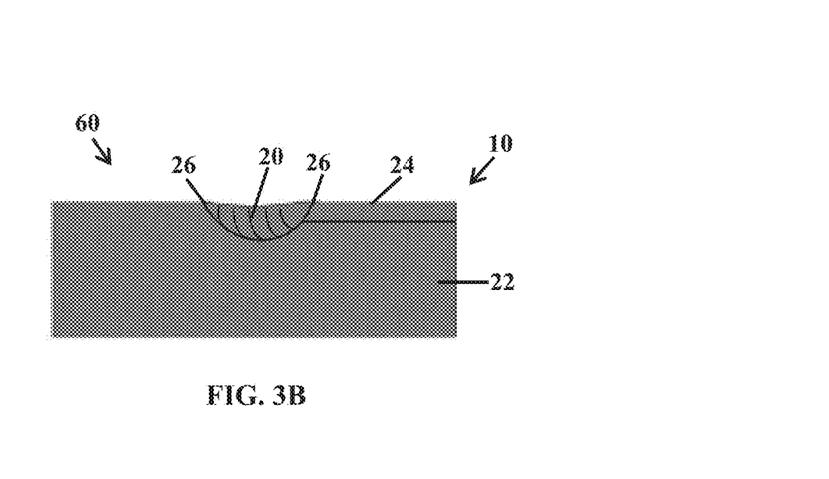

FIG. 3A is a front view of the burr removal step of FIG. 2A, and FIG. 3B is the same view following the burr removal step. FIG. 4 is a front perspective view of the burr removal step of FIG. 2A.

Figure 2B:
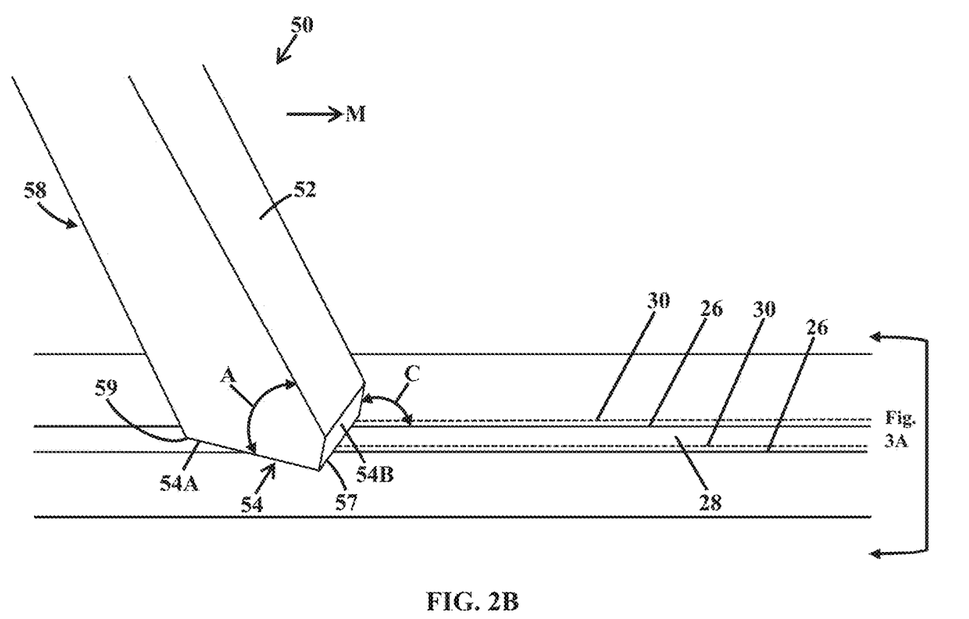
FIG. 2B is a side view of a friction stir weld of the present description that includes burrs at the weld surface, and an alternative example of a deburring tool.

In an alternate embodiment of a tool, and method, shown at FIG. 2B, example deburring tool 50 includes front face 52, back face 58, and bottom face 54, which includes front-bottom face 54B and back-bottom face 54A. A front edge of front-bottom face 54B meets at a bottom edge of front face 52 to form front-bottom edge 55 extending along the width of tool 50. A back edge of back-bottom face 54A meets at a bottom edge of back face 58 to form back-bottom edge 59 extending along the width of tool 50. Middle-bottom edge 57 is formed in the width direction at the boundary of front-bottom face 54B and back-bottom face 54A. Front-bottom face 54B and back-bottom face 54B extend in the thickness direction and in the width direction of the tool; front-bottom face 54B extends in the thickness direction between front-bottom edge 55 and middle-bottom edge 57; back-bottom face 54A extends in the thickness direction between middle-bottom edge 57 and back-bottom edge 59. In use, while maintaining contact and pressure, metal edge 57 is contacted with and moved along a length of friction stir weld 20, e.g., in direction M as represented by the arrow of FIG. 2A. Movement of metal edge 57 along friction stir weld 20 causes metal edge 57, front-bottom face 54B, or both, to contact burrs 30, to remove burrs 30 from friction stir weld 20. Preferably, only a single pass of tool 50 over surface 28 is sufficient to produce an at least substantially burr-free friction stir weld surface 60 on the trailing side of tool 50.

Still referring to FIG. 2B, while tool 50 is advanced in direction M along a length of friction stir weld 20, tool 50 may be oriented vertically or non-vertically relative to the workpiece and surface 28, to produce an angle (B) between front face 52 (at a bottom portion, adjacent to metal edge 56) and planar surface 28 of friction stir weld 20. As shown generally at FIG. 2B, angle B may be vertical (90 degrees) or obtuse vertical. For example angle B between planar surface 28 and front face 58 may be in a range from about 90 to 160 degrees, e.g., from 100 to 120 or 135 degrees. Angle C between planar surface 28 and front-bottom face 54B shown at FIG. 2B may be vertical (90 degrees), acute, or obtuse, e.g., in a range from 45 to 110 degrees, e.g., from 60 to 85 or 90 degrees.

Figure 2C:
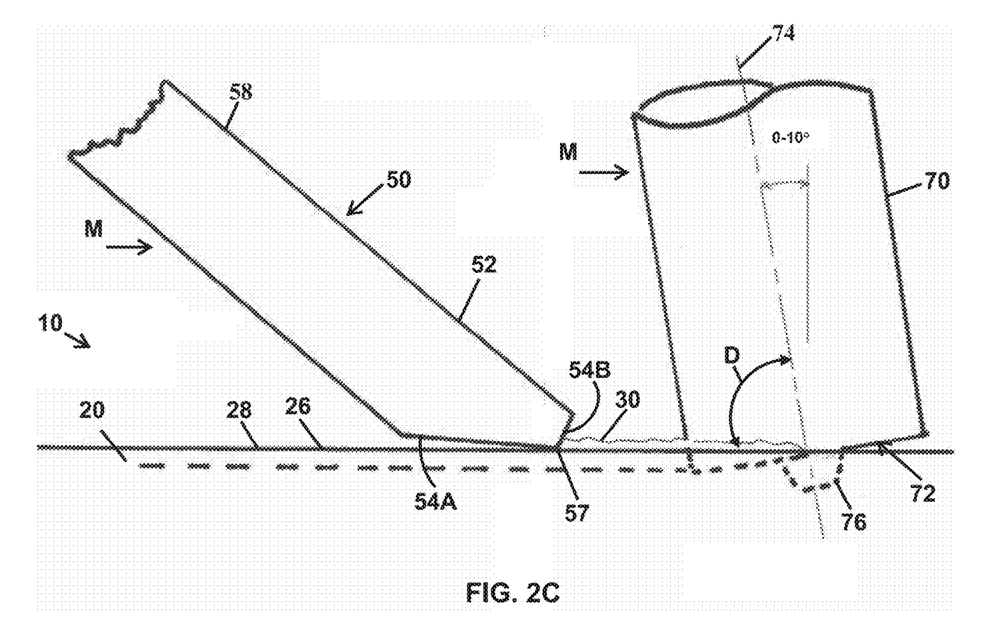
FIG. 2C is a side view of a method as described of forming and deburring a friction stir weld.

Referring to FIG. 2C, burr removal tool 50 of FIG. 2B is shown in a method that includes a friction stir welding step followed promptly by a burr removal step. FIG. 2C also shows friction stir weld tool 70, also described generally herein, which includes a cylindrical body having a distal face 72 and pin 76 extending from the distal face along longitudinal axis 74. With friction stir weld tool 70 being rotated about longitudinal axis 74, distal face 72 is held against workpiece 10, with pressure, and is moved longitudinally in direction M to form friction stir weld 20, edges 26 of which include burrs 30. Longitudinal axis 74 is held at an angle relative to planar surface 28 (the top surface of workpiece 10), e.g., at an angle D in a range from 80 to 90 degrees, causing friction stir weld 28 to be concave.

Burr removal tool 50 is as described at FIG. 2B, and includes front face 52, back face 58, front-bottom face 54B, and middle-bottom edge 57. In the method as illustrated, friction stir weld tool 70 advances in direction M to form friction stir weld 20. Simultaneously, deburring tool 50 advances in direction M at the same translational speed and closely following friction stir weld tool 70. Optionally and preferably, friction stir weld tool 70 and deburring tool 50 can each be held by one carriage that holds both tools stationary relative to each other and moves the two tools together at the same speed in direction M. As deburring tool 50 moves along friction stir weld 20, front-bottom face 54B, middle-bottom edge 57, or both, contact burrs 30 to cause burrs 30 to be dislodged from friction stir weld 20.

An advantage of the configuration of FIG. 2C is that the contact and burr-removal surfaces of burr removal tool 50, e.g., front-bottom face 54B and middle-bottom edge 57, can be located at a location that is very close to pin tool 70, with the body of deburring tool 50 being angled away from pin tool 70. This can be particularly effective for forming a deburred friction stir weld on a workpiece that has rounded corners, such as a rectangular hard disk drive enclosure. To both form and deburr a friction stir weld in a single pass on a workpiece surface that includes rounded corners, the deburring tool can preferably be closely positioned relative to the friction stir weld tool to allow the deburring tool to follow the curved path. This can be accomplished by using a single carriage to hold both the friction stir welding tool and the deburring tool in a stationary and closely-spaced relationship. Connecting the deburring tool to the carriage through an air cylinder can accommodate small deviations in the path of the deburring tool that will occur when rounding the corners, while still maintaining a constant force on the deburring tool.

FIG. 5 is a front perspective view of a burr removal step as described using a set of two separated, parallel metal edges 56 or 57, which may be part of one or a set of two separate tools 50 moving together in direction M. Each metal edge 56 or 57 has a width aligned with a width of a friction stir weld 20, and is moved longitudinally (in the direction of arrow M) during a deburring step along a length of edges 26 of friction stir weld 20 as generally described. Tool or tools 50 may be situated and moved relative to workpiece 10 as generally described, including being optionally held and supported by a carriage and performing a deburring step shortly after a step of forming a friction stir weld as generally and specifically presented herein. A set of two tools 50, each having a separate metal edge 56 or 57, can preferably be independently connected to one or a set of carriers through a resilient connection such as a spring or air cylinder. Independent movement of each of a set of two tools 50 can preferably accommodate slight movement of each tool separately due to mechanical resistance to movement during burr removal, part sizes variations, and the like.

Deburring methods and tools of the present description can be useful for deburring a friction stir weld made by any friction stir weld technique and formed on any workpiece. Still, certain particular embodiments of deburring tools and methods as described can be adapted for use on a workpiece that is an assembly of two metal pieces that include a base and a cover that fit together to form a hermetically sealed enclosure of an electronic device. In such an enclosure, the base and cover can be assembled with the cover over the base, with surfaces of the cover and base forming a joint at which a friction stir weld can be produced, followed by a deburring step. Example enclosures can be useful as part of an electronic device, for example a hermetically sealed hard disk drive, a solid state memory device, a semiconductor device, or a general computing device such as a personal (desktop) computer, cell phone, tablet, laptop, or the like.

An example workpiece can be a cover and base of an enclosure of an electronic device, e.g., a hermetically-sealed hard disk drive. Desirably as a feature of a useful or preferred enclosure or electronic device, an enclosure interior can include a low density atmosphere. During preparation of the enclosure, an interior of the enclosure can be filled with an atmosphere of low density gas to displace air within the interior and to provide a low density (relative to air) atmosphere at the interior. An atmosphere of concentrated helium (e.g., 80, 90, 95 percent helium), for example, is one useful type of low density atmosphere. With the un-welded assembly containing the low density atmosphere, the assembly can be processed by forming a friction stir weld along an entire length of a joint formed between the cover and the base, meaning around the entire perimeter of the assembly. The friction stir weld can be effective to hermetically seal the enclosure and contain the low density gas inside of the enclosure while preventing other gases at an exterior of the enclosure from entering the enclosure. Example enclosures that include a friction stir weld as a hermetic seal can allow for not more than a very low rate of leakage from the enclosure through the weld, for example a rate of leakage that is less than 1 percent of a volume of atmosphere (gas) present within the enclosure per year. Examples of hard disk drives that include a base and a cover and that are hermetically sealed to contain a low density atmosphere are described in U.S. Pat. No. 9,536,572, the entirety of which is incorporated herein by reference. See also U.S. Pat. No. 8,279,552, describing a hermetically sealed hard disk.

In certain preferred examples of useful friction stir welding methods for welding a cover to a base, the base has a vertically-extending sidewall that includes a shoulder at an outer surface of the sidewall between a top and a bottom of the sidewall. The cover includes a top planar portion and a vertically-extending lip. The lip extends along the outer surface of the sidewall of the base when the two pieces are assembled. The lip end portion contacts the shoulder of the sidewall to form a joint, which is a location of formation of a friction stir weld. The thickness of the cover lip at the joint is preferably approximately equal to a width of a horizontal shoulder surface of the sidewall at the joint.

The base generally includes a space or cavity defined by a horizontal (flat, planar) bottom that includes a perimeter, and by a vertically-extending sidewall that extends from the base around the entire perimeter of the base in a vertical direction relative to the horizontal bottom. The sidewall extends continuously about the entire perimeter of the base and includes an upper sidewall, a lower sidewall, a sidewall top, and a horizontally-extending shoulder surface that extends horizontally from the sidewall at a location that is vertically between the top and the bottom of the sidewall along the height of the sidewall. The shoulder extends horizontally from the outer sidewall surface and continuously around the entire perimeter of the base. The horizontal surface of the shoulder connects to the lower portion of the upper sidewall at an interior shoulder corner, and connects to an upper portion of the lower sidewall at an exterior shoulder corner. With the cover and the base in an assembled condition the shoulder engages a lower end portion of the lip of the cover. At that engagement, the lower end portion of the lip forms a joint with the shoulder that extends continuously around the enclosure at the perimeter of the enclosure. As described herein, a friction-stir weld can be formed at the joint, around the entire perimeter of the assembly, then deburred, to produce a hermetic seal that extends entirely around the perimeter of the base and the cover.

The base may be constructed of any useful metal material and may have any general or specific form consistent with the present description. Example base structures may be made of a metal alloy such as an aluminum alloy, for example a 5000 series or 6000 series aluminum alloy. The base structure can be of any useful form, such as being composed of a single integral piece or two or more pieces that are secured (e.g., welded) together. The process for preparing the base may be any, as desired, such as by being forged, extruded, cast, machined, stamped, etc.

The cover includes a horizontal (flat, planar) top portion and a lip that extends from the perimeter of the horizontal portion in a vertical (downward) direction relative to the horizontal top portion. The cover may be constructed of any useful aluminum material (aluminum or aluminum alloy) for example a 4000 series or 6000 series aluminum alloy, may have any general or specific form consistent with the present description. A thickness of a cover as described, i.e., a thickness in a z-dimension (in a height direction) of the top portion of a cover, alternately a thickness in an x- or y-dimension measured at the lip, may be within a useful range that is sufficiently thick to allow for desired friction stir welding of the cover to the base, without being unnecessarily thick. A range of thicknesses that can be useful or preferred is in a range from 10 mils to 40 mils.

Figure 6:
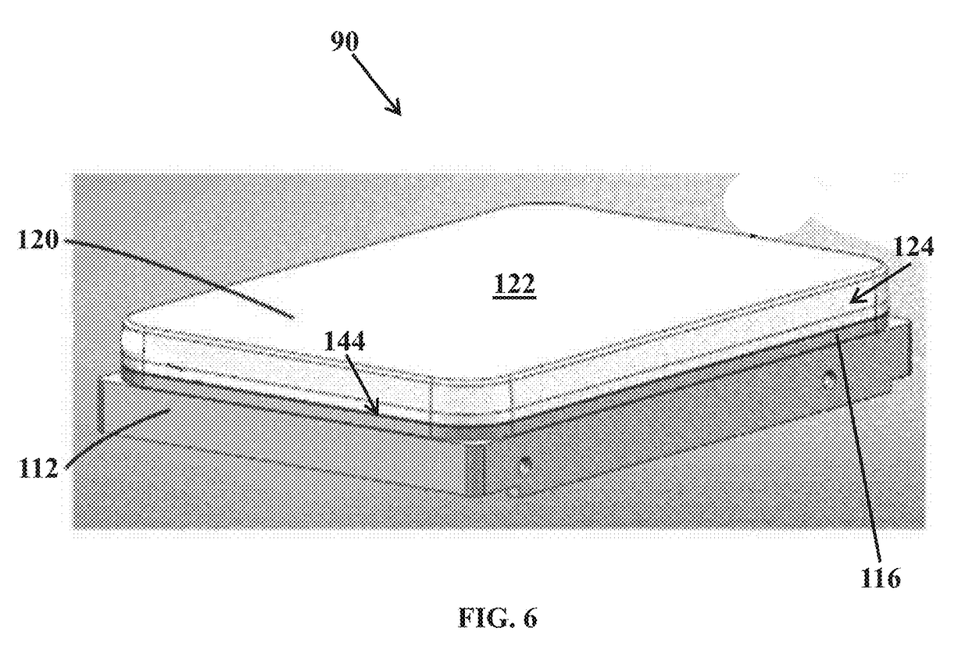
FIG. 6 is a top perspective view of an electronic device enclosure upon which methods of the present description can be used to form and deburr a friction stir weld.
Figure 7:
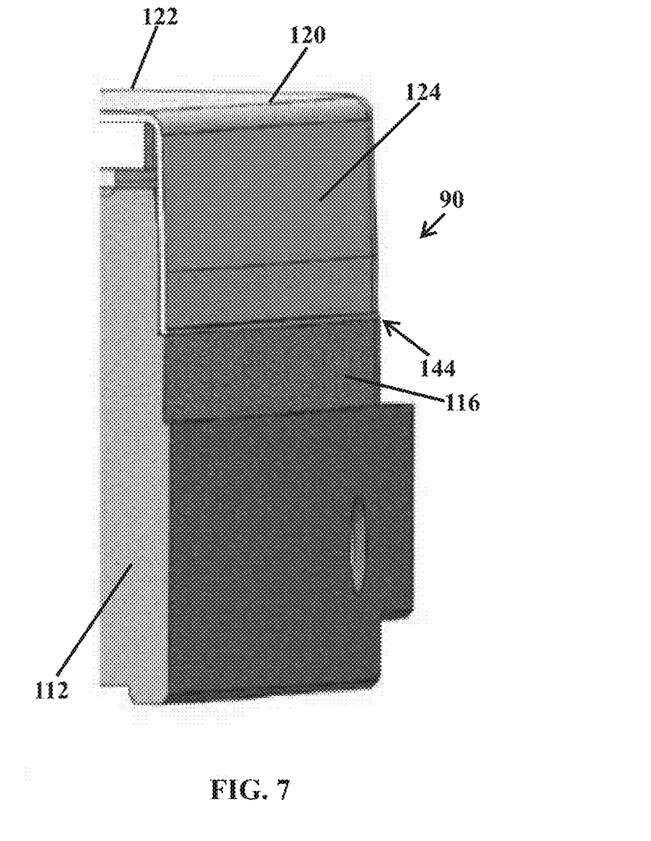
FIG. 7 is a side cut-away view of an electronic device enclosure upon which methods of the description can be used to form and deburr a friction stir weld.

A single example of this type of workpiece is shown at FIGS. 6 and 7, which specifically show an example of an electronic device, e.g., hard disk drive 90, that includes an enclosure made of base 112, cover 120, and that includes an interior cavity. Base 112 includes a horizontally-extending bottom having a perimeter from which sidewall 116 extends in an upward vertical direction. Cover 120 includes horizontally-extending top portion 122 having a perimeter from which extends lip 124 in a downward vertical direction (i.e., at least substantially or approximately vertical with reference to horizontally extending top portion 122). A lower end of lip 126 meets sidewall 116 at joint 144.

Methods of friction stir welding two pieces of a workpiece, e.g., at a joint between a cover and a base as described, can be performed by rotating a friction stir weld tool and contacting the rotating tool, with pressure, to the workpiece at the joint. An example friction stir weld tool can include a support body that has an axis (e.g., a rotational or longitudinal axis), an outer surface centered on the axis, and a distal face centered on the axis and extending from the axis laterally to a distal face perimeter. A pin extends from the distal face in a direction along the axis and distally from the distal face. The distal face can preferably include a scroll pattern that includes at least two arcuate grooves formed in the distal face. In preferred examples, each groove extends from a groove start location located between the axis and the distal face perimeter, and extends continuously to a groove end segment at the distal face perimeter.

The distal face perimeter can preferably include arcuate "shoulder" segments that extend about the distal face perimeter between the alternating groove end segments. These shoulder segments of the perimeter connect the surface of the distal face to a distal end of the outer surface of the support body. In certain presently-preferred example tools, the distal face perimeter can include chamfered edges at the shoulder segments, as opposed to including a sharp corner along those edges.

The tool rotating in contact with the workpiece generates heat to soften and allow for flow and mixing of the materials of the workpiece, which become the materials of the friction stir weld. The rotating tool heats and mechanically mixes and joins the heated materials using mechanical pressure to soften the materials, while the rotating pin is effective to mix the softened materials. In preferred embodiments, a depth of the friction stir weld is at least as deep as the thickness of one or both pieces that make up a workpiece, preferably at least 5 or 10 percent greater than a thickness of one or both materials of the workpiece, e.g., a cover.

Parameters of a useful step of forming a friction stir weld can be any that are useful to produce a desired friction stir weld. Examples of parameters that can be selected and controlled include rotation speed of the tool, downforce of the tool against the workpiece, speed of the tool along the length of the joint (i.e., speed of forming the weld in a length-wise direction, also referred to as translational speed), angle of the tool relative to the workpiece (e.g., from 1 to 10 degrees), as well as dimensions of the tool itself such as the diameter of the tool at the shoulder (distal face) and the diameter and length of the pin (pin length being measured along the axis of the tool from the distal face).

A diameter of the tool at the shoulder (i.e., a maximum diameter at the distal face) can approximate a width of a friction stir weld that is formed. Any diameter can be used that will provide a weld that has sufficient strength, and that will be useful for efficiently preparing a friction stir weld as described. Examples of diameters of a tool at the shoulder, and corresponding widths of a friction stir weld, may be less than about 10 millimeters., e.g., in a range from 2 to 10 millimeters, such as from 3 to 4 millimeters, or from 3 to 5 millimeters.

A depth of a friction stir weld will typically be slightly greater than a length of a pin extending from the distal face of a tool used to form the weld. A desired depth of a weld as described herein is at least as deep as, preferably deeper than, the thickness of the lip end and the width of the shoulder at a joint at which the weld is formed (see, e.g., FIG. 6 and related text). To form a weld of this depth, the length of the pin should be at least as long as the thickness of the lip (at the joint) of the cover of a workpiece, and at least as long as the width of the shoulder (e.g., a width of horizontal shoulder surface) of the workpiece, preferably at least 5, 10, 20, or 30 percent greater than one or both of those dimensions. According to certain embodiments of tools and friction stir weld methods, a length of a pin can be in a range from 0.2 to 1.5 millimeters. A diameter of the pin, measured at a base of the pin located at a connection of the pin to the distal face, can be any useful diameter, such as a diameter in a range from 0.5 to 1.5 millimeters.

During formation of the weld, the friction stir weld tool can be rotated at a speed that is useful to add sufficient energy to the two metal components of a joint of a workpiece to soften the metal components and allow mixing of the metal components by the tool. Useful and preferred rotational speeds of a tool to form a friction stir weld as described can be at least 1,000 revolutions per minute (rpm), e.g., at least 2,000 rpm, or at least 6,000, 8,000, or 12,000 rpm, and up to about 30,000 rpm.

During formation of the weld, the tool, i.e., at the distal face, can apply a downforce to the two metal components at the joint in a direction along the axis of the tool. Any amount of downforce can be used that will be effective in forming a desired weld in an efficient manner. Examples of a useful downforce may be less than about 1,000 newtons, e.g., less than 500 newtons.

During formation of the weld a tool may be moved along a joint in a lengthwise direction at any useful speed, preferably a speed that will efficiently form a high quality weld. Examples of useful speeds of a tool along a joint during formation of a friction stir weld can be in a range from about 0.1 to 3 meters per minute (e.g., from about 1.6 to 50 millimeters per second).

The invention claimed is:

1. A method of removing burrs from a friction stir weld using a burr removal tool, the friction stir weld having a width, a length, and burrs located at a surface of the weld, the burr removal tool having a metal edge extending along a width, the method comprising:

orienting the width of the metal edge in substantial alignment with the width of the friction stir weld, contacting the metal edge with the surface of the friction stir weld, and with the metal edge held in substantial alignment with the width of the friction stir weld, moving the metal edge along the length of the friction stir weld to cause the metal edge or an adjacent surface to contact the burrs and remove the burrs from the surface, wherein, during contacting the metal edge with the surface of the friction stir weld, the metal edge does not rotate.

2. A method of claim 1 comprising removing substantially all of the burrs from the friction stir weld by contacting the burrs only a single time with the moving metal edge.

3. A method of claim 1 comprising moving the metal edge along the length of the friction stir weld at a speed in a range from 1.6 to 200 millimeters per second.

4. A method of claim 1 comprising orienting a front face of the deburring tool at an angle of 90 degrees or greater relative to the surface.

5. A method of claim 1 comprising holding the tool against the surface using a force in a range from 3 to 10 pounds.

6. A method of claim 1 wherein the metal edge is connected to a spring to hold the metal edge against the surface.

7. A method of claim 1 comprising contacting the burrs only a single time to remove at least 98 percent of the burrs along a length of the friction stir weld.

8. A method of claim 1 wherein the metal edge is made of a carbide.

9. A method of claim 1 wherein the metal edge is contacted with the surface of the friction stir weld while the surface remains at a temperature of at least 100 degrees Celsius, following formation of the friction stir weld.

10. A method of claim 1 wherein the metal edge is contacted with the surface of the friction stir weld within 3 seconds after formation of the friction stir weld.

11. A method of claim 1 wherein the metal edge is contacted with the surface of the friction stir weld within 1 second after formation of the friction stir weld.

12. A method of claim 1 wherein the friction stir weld is included as part of an electronic device enclosure.

13. A method of claim 12 wherein the enclosure is an enclosure for a hard disk drive.

14. A method of producing a friction stir weld that includes burrs at a surface of the weld, and removing the burrs from the surface, the method comprising, using a rotating friction stir weld tool to produce a friction stir weld on a workpiece that includes a first metal piece and a second metal piece, by:

placing the tool in contact with the workpiece, and rotating the tool about the axis while the tool contacts the workpiece to form a friction stir weld between the first metal piece and the second metal piece, wherein the friction stir weld has a width, a length, and burrs located at a surface of the weld, and removing the burrs from the surface using a burr removal tool, the burr removal tool having a metal edge extending along a width, with removing the burrs comprising:

orienting the width of the metal edge in substantial alignment with the width of the friction stir weld, contacting the metal edge with the surface of the friction stir weld, and while holding the burr removal tool behind the friction stir weld tool, moving the metal edge along the length of the friction stir weld to cause the metal edge or an adjacent surface to contact the burrs and remove the burrs from the surface.

15. A method of claim 14 comprising removing at least 98 percent of the burrs from the friction stir weld surface by contacting the burrs only a single time with the metal edge.

16. A method of claim 14 comprising producing the friction stir weld and removing the burrs from the surface using the burr removal tool within less than 3 seconds from producing the friction stir weld.

17. A method of claim 14 supporting the rotating friction stir weld tool using a carriage, supporting the deburring tool at a fixed location behind the rotating friction stir weld tool, using the carriage, moving the carriage to maintain contact between the friction stir weld tool and the workpiece to form the friction stir weld while simultaneously maintaining contact between the deburring tool and the friction stir weld behind the rotating friction stir weld tool, to remove the burrs.

18. A method of claim 14 wherein the first metal piece is aluminum and has a first thickness in a direction of the axis, and the second metal piece is aluminum and has a second thickness in the direction of the axis, and the first thickness is less than the second thickness.

19. A method of claim 14 wherein the first piece is a cover of an electronic device enclosure, the second piece is a base of the electronic device enclosure, and the friction stir weld is produced at a joint between the cover and the base.

* * * * *